US011961468B2

(12) United States Patent
Malhotra et al.

(10) Patent No.: US 11,961,468 B2
(45) Date of Patent: Apr. 16, 2024

(54) MULTI-PIXEL COLLECTIVE ADJUSTMENT FOR STEADY STATE TRACKING OF PARAMETERS

(71) Applicant: Samsung Display Co., Ltd., Yongin-Si (KR)

(72) Inventors: Gaurav Malhotra, Cupertino, CA (US); Anup Jose, San Jose, CA (US); Amir Amirkhany, Sunnyvale, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/183,061

(22) Filed: Feb. 23, 2021

(65) Prior Publication Data

US 2022/0093041 A1 Mar. 24, 2022

Related U.S. Application Data

(60) Provisional application No. 63/081,700, filed on Sep. 22, 2020.

(51) Int. Cl.
*G09G 3/3233* (2016.01)

(52) U.S. Cl.
CPC ..... *G09G 3/3233* (2013.01); *G09G 2320/029* (2013.01); *G09G 2320/045* (2013.01)

(58) Field of Classification Search
None
See application file for complete search history.

(56) References Cited

U.S. PATENT DOCUMENTS 4,953,019 A * 8/1990 Skikakura .............. H04N 19/98 375/240.03
11,615,739 B1 * 3/2023 Kim .......................... G09G 3/32 345/214

(Continued)

FOREIGN PATENT DOCUMENTS

EP 3038091 A2 6/2016
EP 3779951 A1 2/2021

OTHER PUBLICATIONS

Signum function definition downloaded Apr. 1, 2022 from https://www.planetmath.org/SignumFunction, pp. 1-3 (Year: 2022).*

(Continued)

*Primary Examiner* — Dorothy Harris
(74) *Attorney, Agent, or Firm* — Lewis Roca Rothgerber Christie LLP

(57) ABSTRACT

A method for compensating for transistor aging in a display device is presented. The method entails dividing pixels into a plurality of groups including a first group, the first group including Z pixels wherein Z>1, sampling a pixel current for each pixel in a subset of pixels in the first group, the subset including M pixels wherein 1≤M≤Z, determining an $Error_M$ using the sampled pixel current for the M pixels and a predefined reference current, and adjusting an input voltage for a transistor in more than one of the Z pixels based on the $Error_M$. The adjusting of the input voltage may include generating a modified voltage $V_d$, wherein $$V_d = A * V_{in} + B,$$

and each of A and B is determined using $\Sigma_M$ sign($Error_m$).

14 Claims, 8 Drawing Sheets

(56) References Cited

U.S. PATENT DOCUMENTS

2004/0150592 A1* 8/2004 Mizukoshi ........... G09G 3/3233 345/76
2006/0109286 A1* 5/2006 Damera-Venkata ..... H04N 5/21 348/E5.077
2008/0204444 A1* 8/2008 Ryu ..................... G09G 3/3614 345/214
2010/0092044 A1* 4/2010 Chen ...................... H04N 5/144 382/107
2011/0050747 A1* 3/2011 Ishii ..................... G09G 3/3208 345/690
2012/0299973 A1* 11/2012 Jaffari .................... G09G 3/006 345/690
2014/0198092 A1* 7/2014 Azizi ..................... G09G 3/006 345/212
2015/0009204 A1* 1/2015 Chaji ................... G09G 3/3233 345/76
2016/0133193 A1 5/2016 Lee et al.
2016/0189618 A1* 6/2016 Park ..................... G09G 3/3233 345/77
2017/0039939 A1* 2/2017 Chaji ................... G09G 3/3225
2017/0039953 A1* 2/2017 Lee ...................... G09G 3/3233
2017/0287397 A1* 10/2017 Sawa ................... G09G 3/3233
2019/0156747 A1 5/2019 Nie et al.
2019/0221146 A1* 7/2019 Lin ........................ G09G 3/006
2020/0051483 A1* 2/2020 Buckley ................. G09G 3/002
2021/0049943 A1* 2/2021 Jose ......................... G09G 3/32
2021/0049951 A1* 2/2021 Amirkhany ............ G01R 17/02
2021/0049963 A1* 2/2021 Amirkhany .......... G09G 3/3258

OTHER PUBLICATIONS

Signum function definition downloaded Apr. 1, 2022 from https://en.wikipedia.org/wiki/Sign_function#:~:text=In%20mathematics%2C%20the%20sign%20function%20or%20signum%20function,this%20function%20is%20usually%20called%20the%20signum%20function. ). , pp. 1-4 (Year: 2022).*

Bismor et al, Review and Comparison of Variable Step-Size LMS Algorithms, 2016, pp. 24-39 (provided by Applicant in the response dated Nov. 22, 2022) (Year: 2016).*

European Search Report from European Patent Office for European Application No. 21188632.0, pp. 1-14.

* cited by examiner $$\begin{bmatrix} A_{n+1}^{(R1,C1)} \\ A_{n+1}^{(R1,C2)} \\ \cdot \\ \cdot \\ \cdot \\ A_{n+1}^{(R1,CZ)} \end{bmatrix} = \begin{bmatrix} A_{n}^{(R1,C1)} \\ A_{n}^{(R1,C2)} \\ \cdot \\ \cdot \\ \cdot \\ A_{n}^{(R1,CZ)} \end{bmatrix} + k * \sum_{M} sign(Error_m) * \begin{bmatrix} Code_{n}^{(R1,C1)} \\ Code_{n}^{(R1,C2)} \\ \cdot \\ \cdot \\ \cdot \\ Code_{n}^{(R1,CZ)} \end{bmatrix}$$

$$\begin{bmatrix} B_{n+1}^{(R1,C1)} \\ B_{n+1}^{(R1,C2)} \\ \cdot \\ \cdot \\ \cdot \\ B_{n+1}^{(R1,CZ)} \end{bmatrix} = \begin{bmatrix} B_{n}^{(R1,C1)} \\ B_{n}^{(R1,C2)} \\ \cdot \\ \cdot \\ \cdot \\ B_{n}^{(R1,CZ)} \end{bmatrix} + k * \sum_{M} sign(Error_m)$$

FIG. 5

Single pixel

MULTI-PIXEL COLLECTIVE ADJUSTMENT FOR STEADY STATE TRACKING OF PARAMETERS

CROSS-REFERENCE TO RELATED APPLICATION

This application claims the benefit of U.S. Provisional Patent Application No. 63/081,700 filed on Sep. 22, 2020, the content of which is incorporated by reference herein.

BACKGROUND

This disclosure relates to active matrix display devices, and particularly to display devices having thin film switching transistors associated with each pixel.

Different types of active matrix display devices are known today, including but not limited to organic light emitting diode (OLED) devices and liquid crystal display (LCD) devices. FIG. 1 shows an example of a conventional active matrix addressed display device that includes an array of pixels 1, each of the pixels 1 having a display element 2. As shown, the display device comprises a panel having a plurality of pixels 1 arranged in rows and columns Although a small number of pixels 1 are shown in FIG. 1 for simplicity, a display panel comprises hundreds and thousands of pixels. The pixels 1 are driven by a row driver 8 and a column driver 9, which receive and process data from a signal controller 7 and transmit signals on scan lines S and data lines D.

The display panel may have current-addressed display elements 2. There are various circuits for providing a controllable current through the display element 2, and each pixel 1 is configured to emit light based on a received current. The current that a pixel 1 receives is controlled by a driving transistor. To cause the pixel to output a particular color, a display device may apply a voltage to the gate of the transistor based on the particular color. A storage capacitor may be included to hold the gate voltage after the addressing phase.

Often, during operation, characteristics (e.g., mobility and voltage threshold) of the transistor may change (e.g., due to heat). Application of high voltages above the threshold voltage causes large changes in threshold voltage over time. As not all the pixels 1 are used the same way or stay on for the same amount of time, a large difference in the threshold voltages of transistors in different pixels may result. Accordingly, the transistor may output a first current value to the pixel responsive to a particular voltage value at a first time but output a second current value to the pixel responsive to the particular voltage value at a second time. This differential aging may cause problems with the display device.

Given the large number of pixels in a display device, compensating for the transistor change for each pixel individually is a huge task. If temperature and ambient light change faster than the pixels can converge, there will be no convergence and no effective update. A fast and efficient method of dealing with the different changes of pixels in a display device is desired.

SUMMARY

In one aspect, the disclosure pertains to a method for compensating for transistor aging in a display device. The method entails identifying Z pixels that are included in a first group of a plurality of groups, wherein Z>1, sampling a pixel current for each pixel in a subset of pixels in the first group, the subset including M pixels, wherein 1≤M≤Z, determining an $Error_M$ using the sampled pixel current for the M pixels and a predefined reference current, and adjusting an input voltage for a transistor in more than one of the Z pixels using the $Error_M$.

In another aspect, the disclosure pertains to a display device that includes a plurality of pixels arranged in rows and columns, each of the pixels including a transistor, and a sensing front end circuitry. The sensing front end circuitry is configured to sense a pixel current for a subset of M pixels out of Z pixels using $Error_M$, wherein $Error_M=\Sigma_M$ sign ($Error_m$) and m is one pixel of the M pixels.

In yet another aspect, the disclosure pertains to a method of updating parameters used for voltage compensation in a display device. In particular, the disclosed systems and methods update parameters used for voltage compensation for a first pixel in a group of N pixels based on an error $Error_M$ determined for a subgroup of M pixels in the group, wherein 1≤M≤Z, and the error $Error_M=\Sigma_M$ sign($Error_m$).

BRIEF DESCRIPTIONS OF THE DRAWINGS

FIG. 5 depicts an example in which an entire row (or a set of Z pixels in a row, wherein Z>1) is updated simultaneously.

DETAILED DESCRIPTION

Figure 1:
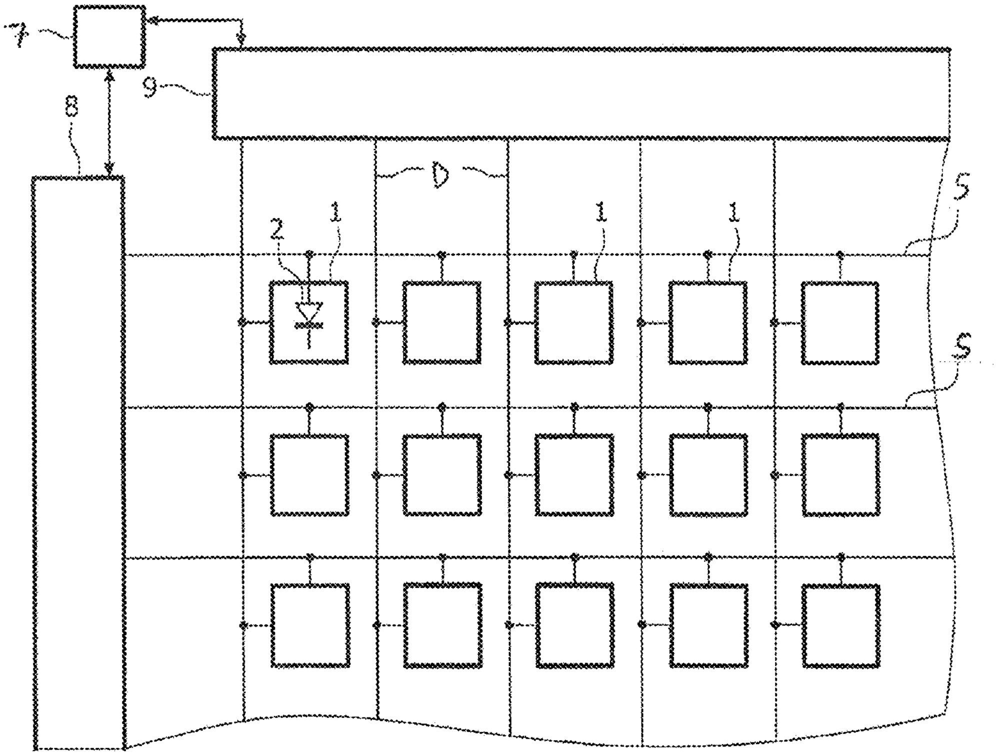
FIG. 1 PRIOR ART
FIG. 1 depicts an example of a conventional active matrix addressed display device that includes an array of pixels.
Figure 2:
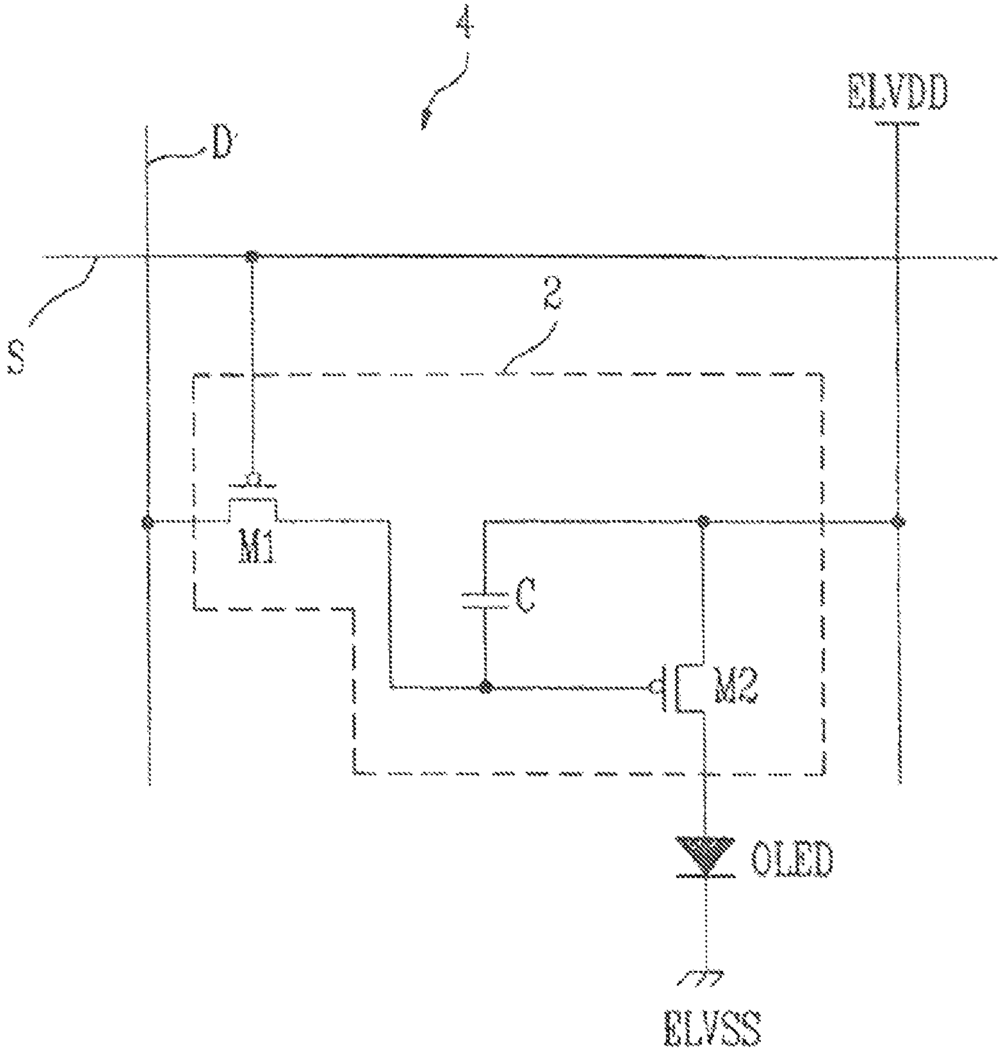
FIG. 2 (Prior Art)
FIG. 2 depicts an example of a conventional photodiode OLED coupled to a drive transistor.

FIG. 2 depicts an example of a conventional photodiode OLED coupled to a drive transistor M2. The drive transistor M2 is controlled by the voltage on its gate, which is stored on a capacitor C during an addressing phase. During the addressing phase, the addressing transistor M1 is turned on, allowing the desired voltage to transfer from the data line D to the capacitor C to reach the drive transistor M2. The photodiode OLED discharges the gate voltage stored on the capacitor C. This way, the photodiode OLED will no longer emit when the gate voltage on the drive transistor M2 reaches the threshold voltage, and the storage capacitor C will stop discharging.

Transistor input current ($I_{DS}$) to output voltage $V_{GS}$ has the following relationship:

$$I_{DS}=C_{OX}*(W/L)*\mu*(V_{GS}-V_{th})^2 \quad \text{[Eq. 1]}$$

where $C_{OX}$ is a coefficient, W and L are width and length of the transistor, respectively, μ is the mobility of the transistor, $V_{GS}$ is the gate voltage, and $V_{th}$ is the threshold voltage. Of the variables, mobility μ and threshold voltage $V_{th}$ are specific to each individual transistor in the display device. Moreover, mobility μ and threshold voltage $V_{th}$ of a single transistor also change with time and usage, for example due to temperature variation. Hence, over time and temperature changes, transistor characteristics between pixels can vary widely. To compensate for the variation in mobility μ and threshold voltage $V_{th}$ among different pixels, and to track the changes in time, a calibration is done to make sure the outcome is still what is intended. In this disclosure, Least Mean Square (LMS) adaptive algorithm is used as an example method of calibrating the pixels; however, other adaptive algorithm may be used.

Running the LMS algorithm on each individual pixel of a display device and converging each pixel to a compensation factor may take too much time. For example, a pentile 120 Hz QHD display has 1560×1440 pixels. If each pixel had two sub-pixels, the number of sub-pixels would equal 4,492,800. Assuming a frame time of around 8.33 milliseconds, and assuming that each pixel requires 100 senses to converge, about 1% of the pixels may be sensed every frame. It would take 100×100 frames for all the pixels to converge, which would take 83 seconds at 120 Hz. Eighty-three seconds is a long time for temperature and ambient light to remain constant on a display device. During this time, conditions within the display device (e.g., temperature) may change before pixels converge, resulting in inaccurate pixel outputs. The system and method disclosed herein overcome this issue by determining parameters for groups of pixels instead of for each individual pixel. Grouping is done for pixels that have error in the same change direction (+ or −).

Figure 3A:
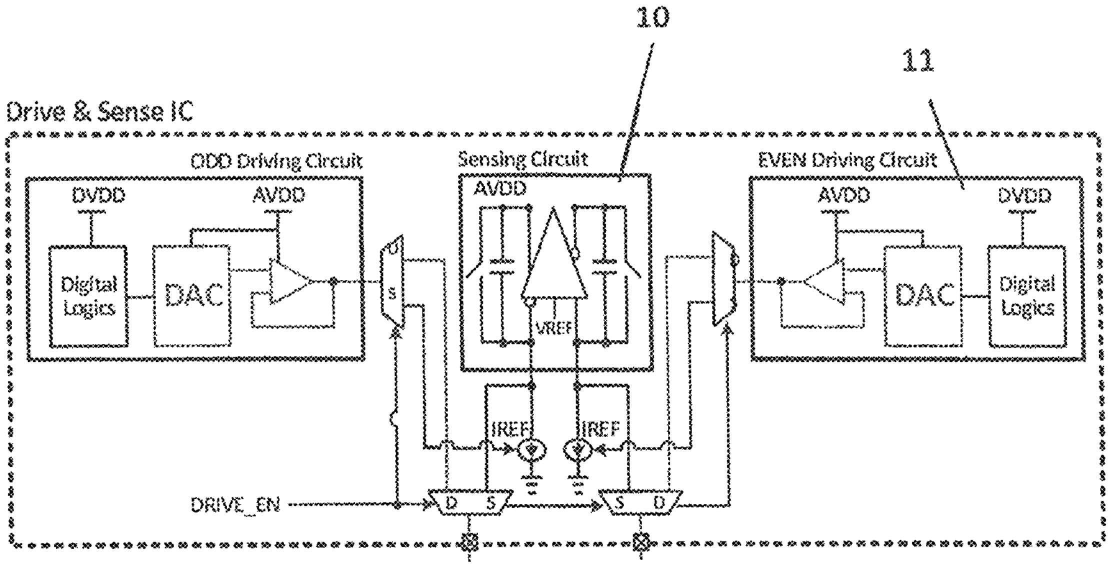
FIG. 3A depicts an example of sensing front end circuitry that is incorporated into a display device.
Figure 3B:
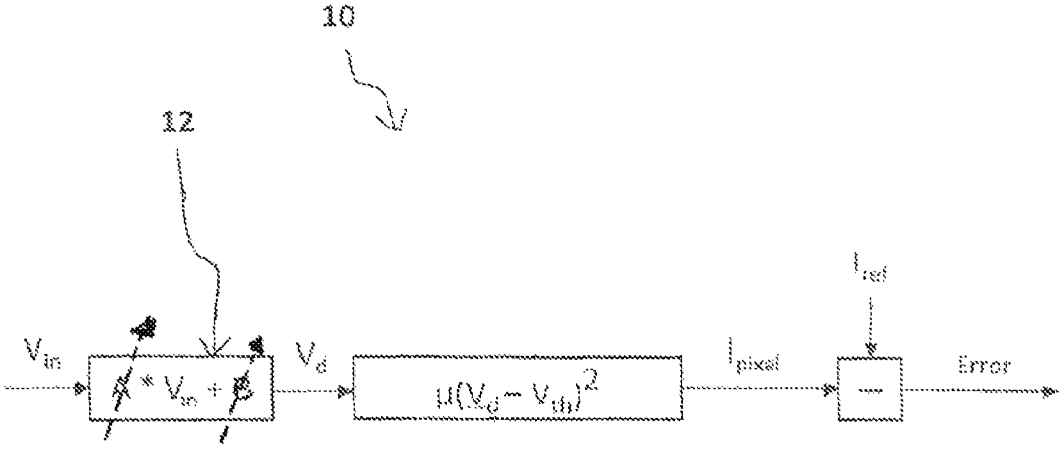
FIG. 3B depicts a sensing circuit that is configured to compare current ($I_{pixel}$) output to a reference current ($I_{ref}$) to generate an error (Error).

FIG. 3A depicts one example of the sensing front end (SFE) circuitry that is incorporated into a display device, for example in column driver 9. As shown, the sensing front end circuitry includes a sensing circuit 10 and a driving circuit 11. FIG. 3B depicts the sensing circuit 10 that is configured to compare current ($I_{pixel}$) output to a reference current ($I_{ref}$) to generate an error (Error). The reference current is current of a predetermined value (e.g., 1 nA) that may be generated by a sensing front end (SFE) circuitry. As shown in FIG. 3B, the drive transistor M2 of a pixel receives an input voltage $V_{in}$ to drive the pixel. Based on the error (Error), a compensation unit 12 of the display device adjusts an input voltage $V_{in}$, which may correspond to a voltage applied to data line D, to generate a modified voltage ($V_d$). The compensation unit 12 of the front-end sensing circuit 10 outputs the modified voltage $V_d$ to the gate of the drive transistor M2, to be used as $V_{GS}$.

In the example of FIG. 3B, the modified input voltage $V_d$ into the drive transistor M2 is determined as follows:

$$V_d = A*V_{in}+B, \quad \text{[Eq. 2]}$$

where A is a first parameter and B is a second parameter. The compensation unit 12 may iteratively adjust the first parameter A and the second parameter B until the current output to the pixel ($I_{pixel}$) converges to the reference current ($I_{ref}$). Accordingly, color output by the pixel may converge to a desired level. In FIG. 3B, the broken arrows over A and B indicate that the values of A and B are being updated by an adaptation circuit.

The first parameter A and the second parameter B for a pixel z are determined as follows:

$$A_{n+1} = A_n + \text{step}*K*\text{Error}_z*X_n \quad \text{[Eq. 3a]}$$

$$B_{n+1} = B_n + \text{step}*K*\text{Error}_z \quad \text{[Eq. 3b]}$$

As used herein, the subscript "n" indicates one iteration for pixel, and the subscript "n+1" indicates a next iteration for the same pixel. In display devices, due to the large panel noise, the term $\text{Error}_n$ has a low probability of being correct. Hence, the parameter "step" may be set small such that each measurement does not change the first parameter A and the second parameter B drastically. With the small step size, it may take several updates to the first and second parameters A and B for them to converge to correct value. The smallness of the parameter step limits the tracking bandwidth of the adaptive algorithm LMS. If pixel parameters change faster than the time it takes for the parameters A and B to converge, the algorithm never converges. Hence, the speed at which convergence is reached affects how much benefit is derived from the voltage adjustments.

As used herein, "Z" is the number of pixels in a group, wherein the group is updated using the same $\text{Error}_M$ value. Z is greater than 1, and "z" indicates a pixel of the Z pixels. "M" is a subset of Z and a number that is not larger than Z, and "m" is a pixel of the subset M.

To reach convergence faster without increasing the step size, the method and apparatus of this disclosure group pixels and perform collective updates, instead of updating each pixel individually. Pixels may be grouped based on the probability that they will experience similar environmental changes (e.g., the same change in temperature) and/or the wiring of the pixels, which may make certain groupings logical/practical. In one embodiment, each "row" of pixels may be treated as a group. The current is sensed for a subgroup of sample pixels. In one embodiment, the subgroup includes fewer than all pixels of the group. One or more errors are determined based on the current of the sample pixels. Based on these one or more errors, the first parameter (A) and the second parameter (B) are updated for each pixel that is in the same group as the sampled pixel.

Changes in threshold voltage (Vth) and Mobility (μ) due to temperature and ambient conditions (e.g., amount of light) happen in the same direction (i.e., both increase or decrease) for neighboring pixels. Thus, errors from multiple pixels may be correlated and combined for least mean square (LMS) updates. This disclosure uses this correlation to modify the LMS algorithm such that a plurality of pixels may be updated within one (or few) frames. The disclosure also entails using linear prediction to predict initial value for the next pixel based on previous pixels. As will be described below, once the value for pixel 1 is determined, that value may be used to predict an initial value for pixel 2 rather than using 0 or 1 as the initial value.

In examples in which the disclosed systems and methods update the parameters for a group based on a single sensed error ($\text{Error}_z$), the disclosed systems and methods set each pixel's first parameter (A) and second parameter (B) according to the following equations:

$$A_{n+1} = A_n + \text{step}*\text{sign}(\text{Error}_z)*X_n \quad \text{[Eq. 4a]}$$

$$B_{n+1} = B_n + \text{step}*\text{sign}(\text{Error}_z) \quad \text{[Eq. 4b]}$$

where step corresponds to a step size of a least mean squares (LMS) algorithm, sign is a signum (sgn) function, and $X_z$ corresponds to an input code word associated with $V_{in}$ for pixel z. Initial values $A_n$ and $B_n$ are predetermined values, and may be set as constants or values based on estimated properties of the transistors, to determine $A_{n+1}$ and $B_{n+1}$. Using $A_{n+1}$ and $B_{n+1}$ as the first parameter A and the second parameter B in Equation 2, the modified input voltage $V_d$ can be determined. Different pixels in a group may have different modified input voltages $V_d$ because the different pixels may receive different input voltages $V_{in}$, and also because the different pixels may start with different $A_n$ and $B_n$ values ($A_n$ and $B_n$ are specific to pixel z).

Figure 4:
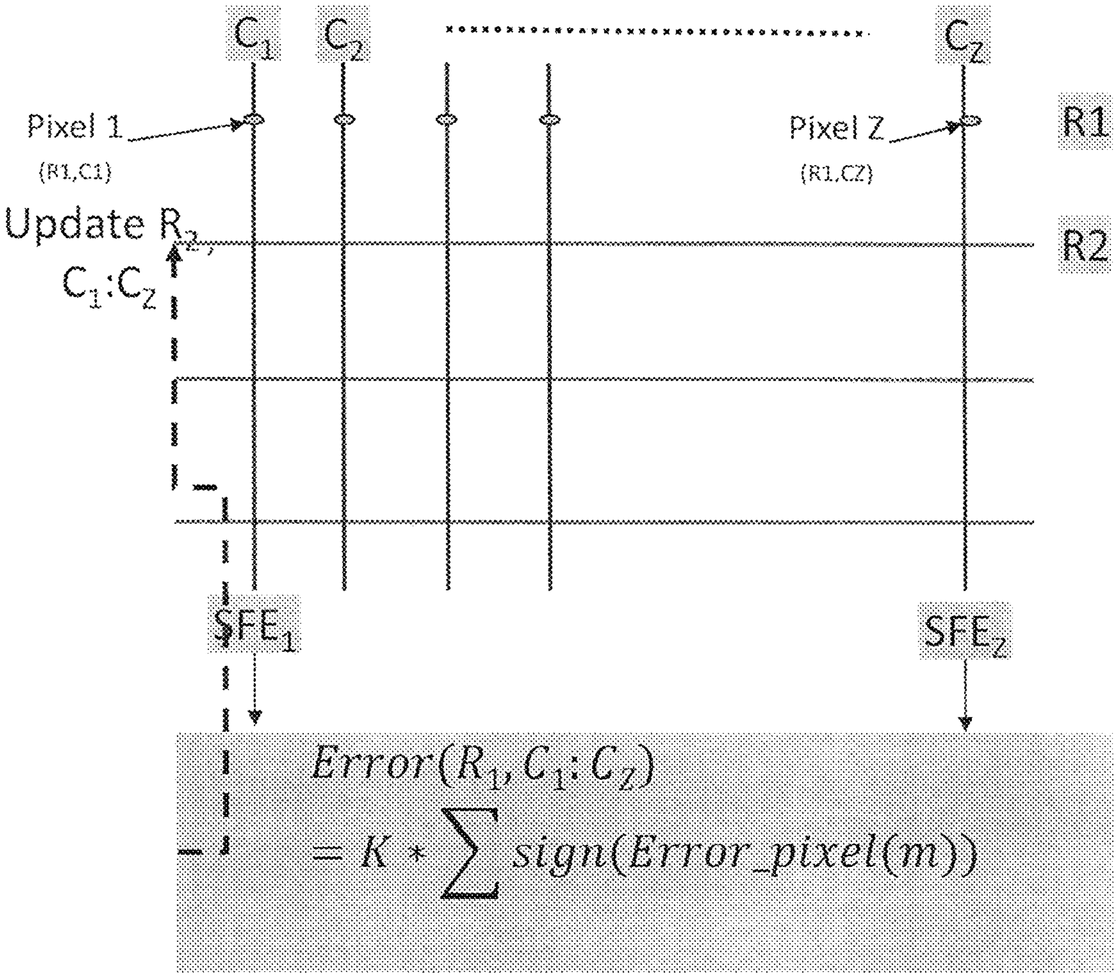
FIG. 4 depicts an example in which the disclosed systems and methods update the parameters for a group based on sensed error for a subgroup of pixels in the group.

FIG. 4 depicts an example in which the disclosed systems and methods update the parameters for a group of pixels using the same value of $Error_M$, wherein $Error_M$ is based on sensed error for a subgroup M of multiple pixels. Unlike in the case of Equations 4a and 4b above, where $Error_z$ was based on sampling of a single pixel z, Equations 5a and 5b apply to a case where $Error_M$ is determined based on sampling of more than one pixel, where M>1 and $Error_M=\Sigma_M \text{sign}(Error_m)$. The disclosed systems and methods set the first parameter (A) and the second parameter (B) for each pixel according to the following equations:

$$A_{n+1}=A_n+\text{step}*K*\Sigma_M \text{sign}(\text{Error}_m)*X_n \quad \text{[Eq. 5a]}$$

$$B_{n+1}=B_n+\text{step}*K*\Sigma_M \text{sign}(\text{Error}_m) \quad \text{[Eq. 5b]}$$

wherein step corresponds to a step size of a least mean squares (LMS) algorithm, where sign is a sign function and $X_n$ corresponds to an input code word associated with $V_{in}$. K corresponds to gain factor. In this case where there are multiple pixels in a subgroup, the $Error_M$ is a sum of sign function of errors for the pixels in the subgroup. In contrast to the case of Equations 4a and 4b, all Z pixels in a group may update their A and B values for iteration "+1" using the same value of $Error_M$ determined for the M pixels of the subgroup. Each pixel, however, uses its own $A_n$ and $B_n$ values. Hence, different pixels may end up with different $A_{n+1}$ and $B_{n+1}$ values.

Referring to the example illustrated in FIG. 4, the first row (R1) has Z pixels, in Columns $C_1$ through $C_Z$. The Error, referred in FIG. 4 as Error ($R_1$, $C_1$:$C_Z$), is determined by summing the sign of a subgroup of the pixels in row $R_1$ (in the example of FIG. 4, M=Z). $A_n$ and $B_n$ may be set based on estimated properties, or as constants. Using $A_{n+1}$ and $B_{n+1}$ as the first parameter A and the second parameter B in Equation 2, the modified input voltage $V_d$ can be determined for pixel z. Different pixels may have different A and B values. However, the same $Error_z$ (which, in this particular case, is the same as $Error_M$) may be used for the pixels in the entire group to determine $A_{n+1}$ and $B_{n+1}$, for increased efficiency without compromising accuracy. Each pixel (or at least each pixel in subset M) communicates with a portion of the sensing front end (SFE) circuitry 10 on a 1:1 correspondence. Then, update is performed on the next group, which is the second row (R2) in the example of FIG. 4.

FIG. 5 depicts an example in which a set of Z pixels in a row is updated using the same $Error_z$. FIG. 5 refers to the example of FIG. 4 where Z=M. Referring to the array of FIG. 4, individual initial parameters $A_n$, $B_n$ and code $X_n$ for each of the Z pixels may be used, but the same $Error_z$ is applied to all the pixels of the row RE In some embodiments, the $Error_z$ that is determined for a first group (e.g., first row R1) may be used to update the A and B values for a second group (e.g., second row R2). The initial values of A and B (i.e., $A_1$ and $B_1$) for a pixel can be set in several ways. In one example, these initial values are set to a hardcoded constant (e.g., $A_1$=1 and $B_1$=0). In another example, the initial values are based on estimated values (e.g., mobility, threshold voltage, etc.) of the corresponding pixel transistor. K is a predetermined value, such as 1, and may be adjusted to help reach convergence.

Figure 6:
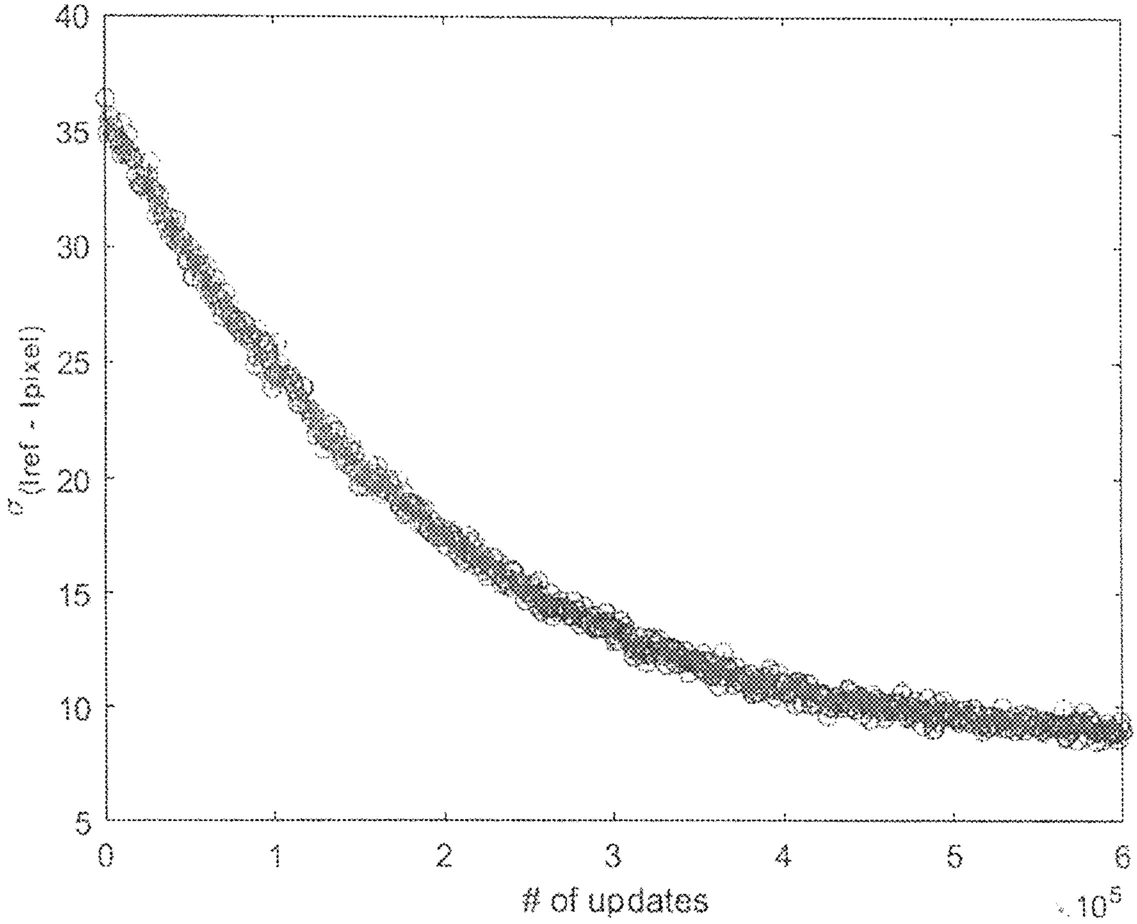
FIG. 6 depicts the change in pixel output as a function of number of updates for a single pixel.
Figure 7A:
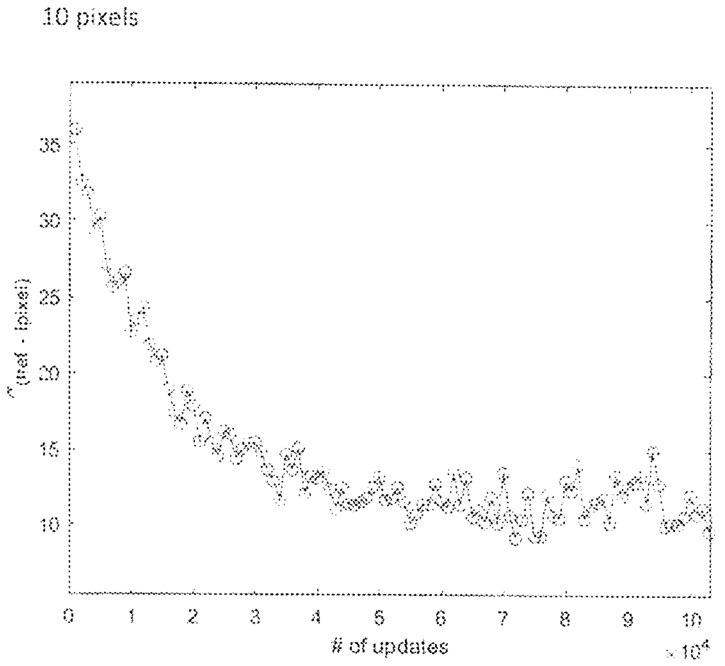
FIG. 7A depicts the change in pixel output as a function of number of updates, wherein updates are performed for 10 pixels at a time.
Figure 7B:
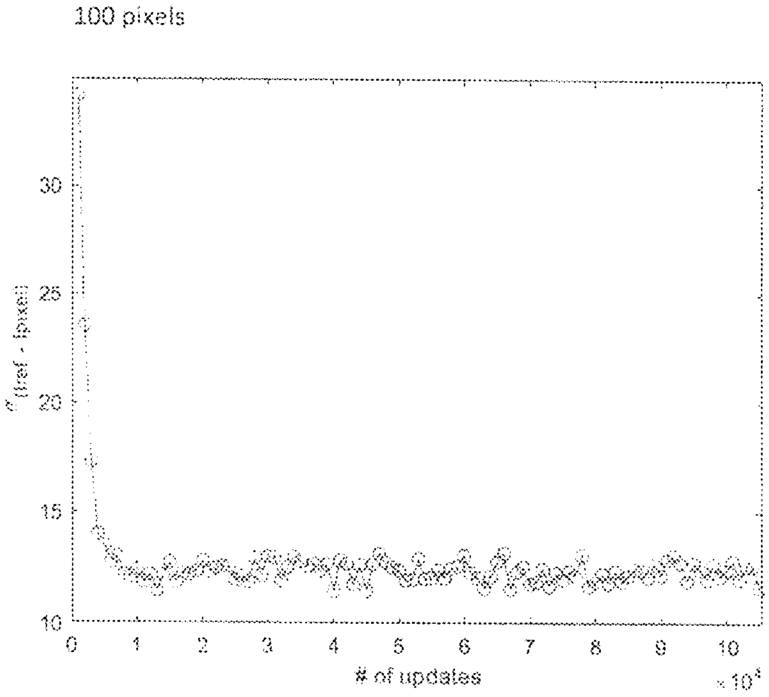
FIG. 7B depicts the change in pixel output as a function of number of updates, wherein updates are performed for 100 pixels at a time.

FIG. 6, FIG. 7A, and FIG. 7B depict the change in pixel output as a function of number of updates. In FIG. 6, which depicts the case of LMS algorithm being run on one pixel at a time (Z=1), it took about $4\times10^5$ updates to reach convergence. Equations 3a and 3b above may be used for each pixel to generate FIG. 6.

In FIG. 7A, where the LMS algorithm is run on 10 pixels at a time (Z=10), it took about $4\times10^4$ updates to achieve convergence. If just one pixel is sampled, Equations 4a and 4b may be used to generate $V_d$ for convergence of $I_{pixel}$ and $I_{ref}$. If multiple pixels are sampled, Equations 5a and 5b may be used. In FIG. 7B, where 100 pixels are updated at a time, it took $1\times10^4$ updates to convergence. By grouping pixels for updates, a dramatic reduction in convergence time is achieved. Transistor's parameters (e.g., $V_{th}$, mobility) may be compensated efficiently by using a "collective error" of pixels that are likely to experience changes in the same direction, such as neighboring/adjacent pixels. With pixel grouping, error correlation may be done in almost real time.

Accordingly, the disclosed systems and methods may set parameters used for pixel compensation for a pixel in a group based on one or more detected errors associated with other pixels in the group. Thus, the disclosed systems and methods may converge more quickly as compared to systems and methods that update each pixel in a display device based on errors detected for that pixel. The concepts disclosed herein may be applied to various types of display devices, including but not limited to organic light emitting diode (OLED) display devices and liquid crystal display (LCD) devices.

Aspects of the systems and methods provided herein can be embodied in programming Various aspects of the technology may be thought of as "products" or "articles of manufacture" typically in the form of machine (or processor) executable code and/or associated data that is carried on or embodied in a type of machine readable medium, such as a chip. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the programming. As used herein, unless restricted to non-transitory, tangible "storage" media, terms such as computer or machine "readable medium" refer to any medium that participates in providing instructions to a processor for execution.

The Least Mean Square calculation process may be implemented using a Field-Programmable Gate Array (FPGA) in the drive circuit (e.g., the sensing front end circuit) of a display device, or a computing device. A machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

While preferred embodiments of the present invention have been shown and described herein, it will be obvious to those skilled in the art that such embodiments are provided by way of example only and are not meant to be construed in a limiting sense. It is not intended that the invention be limited by the specific examples provided within the specification. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for compensating for transistor aging in a display device, comprising:

identifying Z pixels from among a plurality of pixels that are included in a first group of a plurality of groups, wherein Z>1;

sensing, for each pixel in a subset of pixels in the first group, a pixel current output to the pixel, the subset including M pixels, wherein 1≤M≤Z;

determining an $Error_M$ using the sensed pixel current for the M pixels and a predefined reference current; and adjusting, for each pixel of the Z pixels, an input voltage for a transistor of the pixel using the $Error_M$, wherein $Error_M = \Sigma_M sign(Error_M)$, m being one pixel of the M pixels, and $Error_m$ being an error of the one pixel based on the sensed pixel current of the one pixel and the reference current.

2. The method of claim 1, wherein the first group is a row of pixels.

3. The method of claim 1, further comprising dividing the plurality of pixels into the plurality of groups based on direction of pixel current change with usage.

4. The method of claim 1, further comprising:

iteratively determining a parameter value to be used to adjust an input voltage for a transistor of a first pixel; and using linear prediction to predict, based on the determined parameter value to be used to adjust the input voltage of the transistor of the first pixel, an initial parameter value to be used in iteratively determining a parameter value to be used to adjust an input voltage for a transistor of a second pixel.

5. The method of claim 1, wherein the adjusting of the input voltage comprises adjusting the input voltage for at least one transistor in each of the Z pixels.

6. The method of claim 1, further comprising iteratively determining a parameter value to be used to adjust an input voltage for a transistor of a first pixel.

7. A display device comprising:

a plurality of pixels arranged in rows and columns, each of the pixels including a transistor; and a sensing front end circuitry that is configured to sense, for each pixel of a subset of M pixels out of Z pixels in a group, a pixel current output to the pixel, wherein 1≤M≤Z, and adjust, for each pixel of the Z pixels, an input voltage to be supplied to the transistor of the pixel using $Error_M$, wherein $Error_M = \Sigma_M sign(Error_m)$, m being one pixel of the M pixels, and $Error_m$ being an error of the one pixel based on the sensed pixel current of the one pixel and a reference current.

8. The display device of claim 7, wherein the Z pixels of the group have a same direction of transistor output current change with usage.

9. The display device of claim 7, wherein the Z pixels are in a single row.

10. The display device of claim 7, wherein the sensing front end circuitry is configured to:

iteratively determine a parameter value to be used to adjust an input voltage for a transistor of a first pixel; and use linear prediction to predict, based on the determined parameter value to be used to adjust the input voltage of the transistor of the first pixel, an initial parameter value to be used in iteratively determining a parameter value to be used to adjust an input voltage for a transistor of a second pixel.

11. The display device of claim 7, wherein the sensing front end circuitry is configured to adjust the input voltage by applying a least mean squares algorithm to compensate for a change in at least one of a threshold voltage and mobility of the transistor.

12. A method of updating parameters used for voltage compensation in a display device, the method comprising: updating a parameter value for determining an input voltage to a first pixel in a group of Z pixels based on an $Error_M$ determined for a subgroup of M pixels in the group, wherein 1≤M≤Z, the $Error_M = \Sigma_M sign(Error_m)$, wherein m is a pixel of the subgroup of M pixels, and $Error_m$ is an error of the pixel m based on a difference between a pixel current output to the pixel m and a reference current for pixel m.

13. The method of claim 12, wherein the first pixel is not a pixel in the subgroup.

14. The method of claim 12, further comprising using the parameter value that was used to determine the input voltage for the first pixel in the group of Z pixels to select an initial parameter value to iteratively determine the parameter value for a second pixel in a different group of pixels.

* * * * *